United States Patent [19]

Sato

[11] 4,072,995
[45] Feb. 7, 1978

[54] TAPE VIEWING SYSTEM FOR MICRO-CASSETTE TAPE RECORDER

[75] Inventor: Masaaki Sato, Hachioji, Japan

[73] Assignee: Olympus Optical Co., Ltd., Tokyo, Japan

[21] Appl. No.: 741,154

[22] Filed: Nov. 11, 1976

[30] Foreign Application Priority Data

Nov. 21, 1975 Japan .............................. 50-158324[U]
Dec. 15, 1975 Japan .............................. 50-169838[U]
Dec. 18, 1975 Japan .............................. 50-171277[U]
Dec. 18, 1975 Japan .............................. 50-171278[U]

[51] Int. Cl.² .................. G11B 23/08; G11B 23/38
[52] U.S. Cl. .................................. 360/137; 242/197
[58] Field of Search ............. 360/137, 132; 242/197, 242/198, 199, 200, 201

[56] References Cited

U.S. PATENT DOCUMENTS

| 3,485,963 | 12/1969 | Murata | 360/132 |
| 3,557,360 | 1/1971 | Aldridge | 360/137 |
| 3,584,941 | 6/1971 | Downey | 242/199 |
| 3,615,155 | 10/1971 | Gelbman | 242/199 |
| 3,619,625 | 11/1971 | Wood | 242/199 |
| 3,638,955 | 2/1972 | Wada | 242/197 |
| 3,675,876 | 7/1972 | Frederick | 242/198 |
| 3,722,828 | 3/1973 | Kremp | 242/198 |

Primary Examiner—Jay P. Lucas
Attorney, Agent, or Firm—Ostrolenk, Faber, Gerb & Soffen

[57] ABSTRACT

An apparatus for allowing the monitoring of a tape running through a window formed in a tape cassette is provided. The apparatus comprises a light transmitting area formed in the bottom surface of a cassette receiving chamber of a cassette tape recorder, the light transmitting area being located within viewing area of the cassette window. External light admitted through at least a portion of the casing of the tape recorder is passed through the light transmitting area to be incident on the rear side of the tape cassette, thereby enabling a monitoring of the tape running under the aid of the incident light, by visual inspection through the viewing window.

8 Claims, 23 Drawing Figures

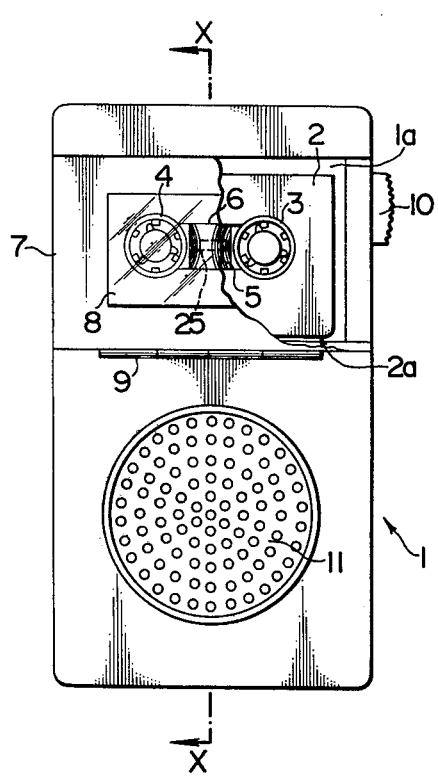
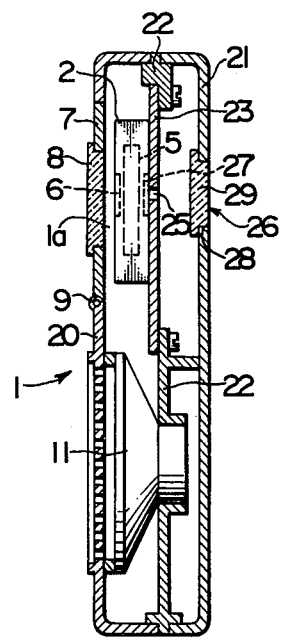
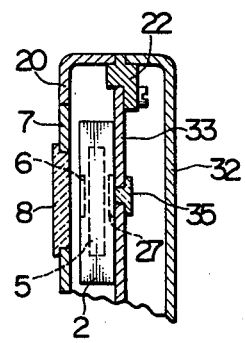
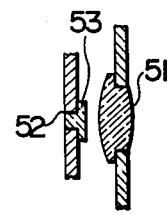

TAPE VIEWING SYSTEM FOR MICRO-CASSETTE TAPE RECORDER

BACKGROUND OF THE INVENTION

The invention relates to a tape viewer for use with a cassette tape recorder, and more particularly to a tape viewer which enables the winding or running condition of a magnetic tape contained in a tape cassette which is loaded into a cassette tape recorder to be monitored by visual inspection through a viewing window formed in the cassette.

A conventional tape cassette is formed with a monitoring window formed by a transparent material which is located intermediate a pair of winding and take-up reels contained in the cassette in order to permit a determination to be made as to how much of the tape is disposed on either one of these reels. However, the small size of the viewing window makes the visual inspection difficult to achieve. On the other hand, a tape cassette which is loaded into a cassette receiving chamber formed in a tape recorder is covered with a dust-proof lid, so that the tape contained within the cassette must be viewed through a pair of windows, namely, the viewing window formed in the cassette and a sight window formed in the lid, thus degrading the amount of available light. Additionally, the sight window is surrounded by a dark panel of a reduced transmittance which is employed for purpose of providing a sightly design, thus further degrading the available light. In order to overcome such difficulty, it has been proposed to provide an illumination lamp within the cassette receiving chamber at a location which corresponds to the viewing window, or to apply a reflector of a high optical reflectivity to a portion of the bottom wall of the cassette receiving chamber which is opposite to the viewing window.

However, with a miniaturization of the cassette as may be exemplified by a micro-cassette developed by the present applicant and which has a size comparable to a packet of matches, the possible size reduction of the viewing window is limited, and the use of the illumination lamp or the reflector is prohibitive. A tape recorder of a miniature size which is used to operate on a micro-cassette is operated by a battery of a reduced capacity, so that the power dissipation involved with the use of the lamp is undesirable. Because the viewing window has a reduced size to result in a reduced amount of light which is admitted, the provision of the reflector is ineffective to provide satisfactory illumination.

SUMMARY OF THE INVENTION

It is an object of the invention to overcome the above difficulty by providing an apparatus including a light admitting window formed in at least one surface of the casing of the tape recorder, separately from a sight window and a viewing window, for admission of an external light, which is then led through a light transmitting opening formed in the bottom surface of the cassette receiving chamber for transmission to an oppositely located viewing window, thereby facilitating a clear viewing of the tape running under the transmitted light.

In this manner, a clear viewing of the tape is permitted as long as at least one surface of the tape recorder is irradiated by external light to permit an impingement thereof through the light admitting window, even if the incidence of light through the viewing window formed in the cassette is reduced.

Other features and advantages of the invention will become apparent from the following description taken together with the attached drawings.

BRIEF DESCRIPTION OF THE DRAWINGS

FIG. 1 is a plan view of a miniature tape recorder developed by the present applicant and in which the apparatus according to the invention is incorporated;

FIG. 2 is a cross-section taken along the line X—X shown in FIG. 1;

FIG. 3 is a fragmentary cross-section of the miniature tape recorder, illustrating one embodiment of the invention;

FIG. 4 is a perspective view of the light transmitting plate shown in FIG. 3;

FIG. 5 is a fragmentary cross-section of another embodiment of the invention;

FIGS. 14-1 to 14-5 are perspective views showing various forms of a bundle of light conducting fibres which is employed as a light conducting member;

DESCRIPTION OF EMBODIMENTS

Figures 1, 14:
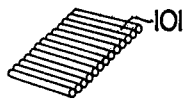

FIG. 1 is a plan view of a miniature tape recorder developed by the present applicant and which incorporates the apparatus according to the invention. The recorder is shown with a right-hand half of a lid, covering a cassette receiving chamber being broken away. In FIG. 1, the body 1 of the tape recorder includes a cassette receiving chamber 1a, which is adapted to receive a cassette 2. As is well known, a pair of tape reels 4, 3 are rotatably mounted within the cassette 2 in the right- and left-hand portions thereof, and a length of magnetic tape 5 has its opposite ends secured to the reels 3, 4 and disposed thereon, with a portion of the tape 5 extending in a taut condition along windows, not shown, formed in a front surface 2a of the cassette 2. The tape 5 disposed about the reels 3, 4 can be viewed through a transparent tape viewing window 6 extending transversely across the reels 3, 4 so as to permit a tape winding on the respective reels to be visually recognized. A lid 7 for covering the cassette receiving chamber 1a is pivotally mounted on the body 1 by means of a hinge 9, and the winding condition of the tape 5 contained within the cassette can be viewed through a transparent side window 8 integrally secured to the lid and through the viewing window 6 formed in the cassette 2. The tape recorder is also provided with an operating knob 10 and a loudspeaker 11.

Figures 2, 14:
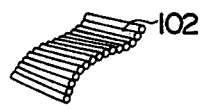

FIG. 2 is a cross-section taken along the line X—X shown in FIG. 1, illustrating the essential parts of the apparatus according to the invention. The body 1 of the tape recorder essentially comprises a casing 20 which forms the front one-half including the front surface, a casing 21 forming the rear one-half including the rear surface, and a frame 22 on which parts internally housed within the tape recorder are mounted. A chassis 23 which forms the bottom surface of the receiving chamber 1a and the loudspeaker 11 is mounted on the frame 22.

Figures 3, 14:

As shown in FIG. 2, the apparatus according to the invention includes a light admitting window 26 located in the casing 21 so as to be opposite the transparent sight window 8 of the lid 7 which is located in the front casing 20. The light admitting window 26 is formed by a window pane 29 of a transparent or translucent material such as a plastic or glass material which is fitted into an opening 28 formed in the casing 21. A transversely elongate light transmitting opening or area 25 which extends parallel to the viewing windows 6, 27 is formed at a position opposite to a tape monitoring window 27 which is on the rear side or on the opposite side of cassette 2 opposite from the viewing window 6. External light which impinges upon the light admitting window 26 formed in the rear casing 21 of the body 1 passes through the light transmitting opening 25 in the chassis 23, the tape viewing window 27 in the rear side of the cassette and the viewing window 6 in the front side of the cassette as well as the transparent sight window 8 in the lid 7. As a consequence, if the incident light through the sight window 8 in the front casing 20 is insufficient to provide reflective light to allow the winding condition of the tape 5 to be viewed clearly, the invention enables the winding condition of the tape 5 to be viewed clearly through the sight window 8 with the aid of the transmitted light which is admitted through the light admitting window 26 from the exterior of the rear casing 21, thereby facilitating a tape monitoring. The tape condition can be clearly monitored in a dark place by directing the light admitting window 26 toward a bright region. In the embodiment described above, if the rear casing 21 of the tape recorder is entirely formed of a translucent material such as a milk-white plastic, for example, to allow a sufficient admittance of external light, it is only necessary that the light transmitting opening 25 be formed in the chassis 23 without requiring the light admitting window 26, as shown in FIG. 3.

The light transmitting opening 25 formed in the chassis 23 may comprise a light transmitting plate 35 of a transparent or translucent material such as a plastic or glass material which is fitted into the chassis. This arrangement is effective to make the space defined by the chassis 23, 33 and the rear casing 21, 32 dust-proof.

Figures 4, 14:
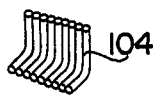
Figures 5, 14:
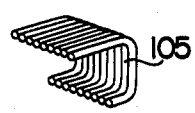

The window pane 29 which forms the light admitting window 26 of FIG. 2 may be formed by a convex lens or a cylindrical lens 51 as shown in FIG. 5 so as to achieve a light condensing effect, thereby effectively increasing the light admitted into the tape recorder. In this instance, a light transmitting plate 53 which is fitted into the light transmitting opening 52 may be translucent or may have a frosted end face for light condensing purposes.

While in the embodiment described above, the light admitting window for admitting external light and guiding it to the light transmitting opening formed in the bottom surface of the cassette receiving chamber is located in the rear surface of the casing of the tape recorder, namely on the opposite surface from the front surface in which the sight window is located, it should be understood that the light admitting window may be located in any surface with similar effect.

Referring to FIGS. 6 to 14, embodiments will be described below which provide an effective utilization of external light by employing a light conducting member connected between the light transmitting area and the light admitting window formed in the casing of the tape recorder and which comprises an efficient light conducting material such as glass or plastic. Except for the light conducting member and associated parts, the miniature tape recorder which incorporates these embodiments is constructed in a manner similar to that shown in FIGS. 1 and 2, and therefore corresponding parts will be designated by like reference characters without repeatedly describing them.

Figure 6:
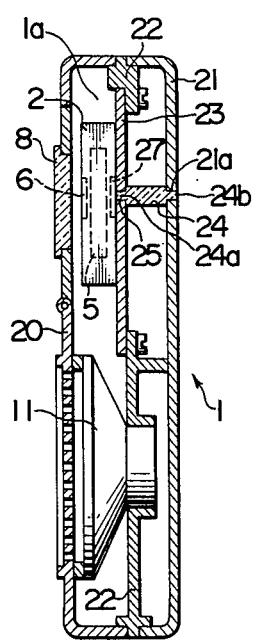
FIG. 6 is a cross-section of the miniature tape recorder incorporating a further embodiment of the invention.
Figure 7:
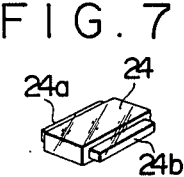
FIGS. 7 to 9 are perspective views showing examples of the light conducting plate.

FIG. 6 is a cross-section of the miniature tape recorder which incorporates a light conducting member. Except for the use of the light conducting member, the essential parts of the tape recorder remain unchanged. Thus, the body 1 of the tape recorder includes the casing 20 which forms the front one-half including the front surface, the casing 21 forming the rear one-half including the rear surface, and the frame 22 on which internally housed parts are mounted. The chassis 23 which forms the bottom surface of the chamber 1a for receiving the cassette 2 as well as the loudspeaker 11 is mounted on the frame 22. In the embodiment shown, the light conducting member comprises a light conducting plate 24, which is formed of a non-colored or colored transparent material such as glass or plastic and is provided with a pair of tabs 24a, 24b on its opposite sides. As shown in FIG. 6, the front tab 24a is fitted into the light transmitting opening 25 which is formed in the chassis 23 at a corresponding position to the rear side monitoring window 27, in parallel relationship with the monitoring windows 6, 27 while the rear tab 24b is fitted into a slit 21a formed in the rear casing 21 at a position corresponding to the light transmitting opening 25. With the light conducting plate 24 disposed in this manner, external light transmitted through the rear casing 21 is led by the light conducting plate 24 to the monitoring window 6, thereby enabling the tape winding to be clearly monitored or viewed through the transparent window 8.

Figure 8:
Figure 9:

FIGS. 8 and 9 show other examples of the light conducting plate 24. Specifically, FIG. 8 shows a light conducting plate 44 which is formed with a recess 44a formed in its side other than the opposite sides which are adapted to be fitted into the slits in order to avoid interference with a mechanism which is internally housed between the rear casing 21 and the chassis 23. The provision of the recess does not substantially alter the intended effect. In FIG. 9, the light conducting plate 44 is formed with a circular opening 54 and a square opening 55. These openings also avoid interference with a mechanism or an electrical wiring which may be passed centrally through the light conducting plate 44. Formation of the light conducting plate to provide for clearance or passage of a component has no significant influence upon the intended functioning of the light conducting plate.

Figure 10:
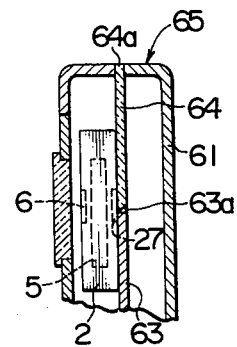
FIG. 10 is a fragmentary cross-section of the miniature tape recorder incorporating still another embodiment of the invention.
Figure 11:
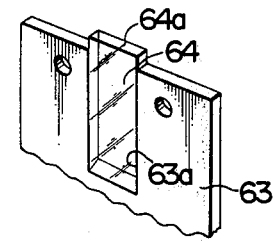
FIG. 11 is a perspective view showing the mounting of the light conducting plate shown in FIG. 10.

FIGS. 10 and 11 show another example of the light conducting plate. In these Figures, a light conducting plate 64 has a thickness which is substantially equal to the thickness which is substantially equal to the thickness of a chassis 63 which forms the bottom surface of a cassette receiving chamber, and has a width which is approximately equal to the lateral width, as measured in a direction perpendicular to the plane of the drawing, of tape monitoring windows 6, 27. The length of the light conducting plate 64 is substantially equal to the spacing between a slit 23a used in the previous embodiment (see FIG. 6) and the upper end face 65 of the body of the tape recorder. The plate 64 is formed of a transparent material such as plastic or glass, and has a lower end face which is bevelled at an angle of 45° to provide a light reflecting surface. The light conducting plate 64 is fitted into a notch 63a formed in the upper central portion of the chassis 63 in conformity to the plate 64, with the bevelled lower end face thereof directed toward the rear casing 61 of the tape recorder. The upper end face 62a of the light conducting plate 64 is substantially flush with the upper surface 65 of the body of the tape recorder.

With this construction, light irradiating the top surface of the body of the tape recorder enters the light conducting plate 64 and is reflected at right angles by the bevelled reflecting surface to be directed toward the monitoring windows 6, 27. As in the previous embodiment in which the light conducting plate 44 is mounted in the rear casing 21, light incident on the upper surface of the casing permits a clear monitoring of the tape winding through the monitoring window 6.

Figure 12:
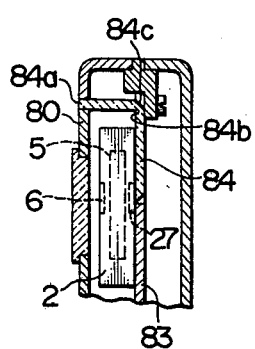
FIG. 12 is a fragmentary cross-section of the miniature tape recorder which incorporates a still further embodiment of the invention employing a light conducting plate having a right angle bend.
Figure 13:
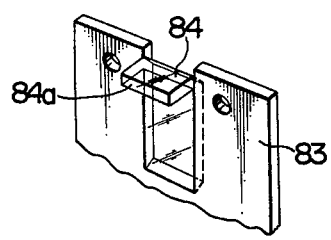
FIG. 13 is a perspective view showing the mounting of the light conducting plate shown in FIG. 12.

FIGS. 12 and 13 show a further example of the light conducting plate which utilize light incident on the front casing of the body of the tape recorder as the transmitted light. While in the previous embodiment, the light conducting plate lies in a single plane with its upper end face located in the upper surface 65 of the body of the tape recorder, a light conducting plate 84 in this instance is centrally formed with an extension which is bent at a right angle from the plane of the remainder of the plate so as to extend toward the surface of the front casing 80, with its forward end face 84a disposed in substantial alignment with the outer surface of the casing 80. The lower end face of the light conducting plate 84 is similarly constructed as in the previous example, and except for its upper portion, it is mounted on the chassis 83 in the similar manner.

With this construction, light incident on the surface of the front casing is utilized as the transmitted light to permit a clear monitoring of the tape winding through the monitoring window 6. The bend 84b in the light conducting plate 84 may be arcuate in cross-section to provide a sufficient amount of transmitted light for practical purposes, but a more effective amount of transmitted light will be obtained by providing a reflecting surface 84c having an angle of 45° on the outer surface of the bend 84b.

FIGS. 14-1 through 14-5 illustrate the light conducting plates 24, 44, 64, 84 each formed by a bundle of light conducting fibres in order to increase the amount of the transmitted light. As is well recognized, a bundle of light conducting fibres is flexible and provides a transmission of light incident on one end thereof to the other end with minimum loss. Thus, it provides an optimum light conducting characteristic and can be shaped or bent into any desired configuration. As a consequence, the light conducting plates in the previous embodiments can be formed by a bundle of light conducting fibres having a desired configuration with an increased amount of transmitted light. Specifically, FIG. 14-1 shows a bundle of light conducting fibres 101 having a configuration corresponding to that of the light conducting plate 24 shown in FIG. 6; FIG. 14-2 shows a bundle of light conducting fibres 102 having a configuration corresponding to that of the light conducting plate 44 shown in FIG. 8; FIG. 14-3 shows a bundle of light conducting fibres 103 having a configuration corresponding to that of the light conducting plate 44 shown in FIG. 9; FIG. 14-4 shows a bundle of light conducting fibres 104 having a configuration corresponding to that of the light conducting plate 64 shown in FIG. 10; and FIG. 14-5 shows a bundle of light conducting fibres 105 which corresponds to the example of FIG. 12. The bundle may have a pair of bends as shown, and may or may not be bevelled at an angle of 45° at their opposite ends. The use of these bundles of light conducting fibres adds to the advantageous effect of the invention.

Figure 15:
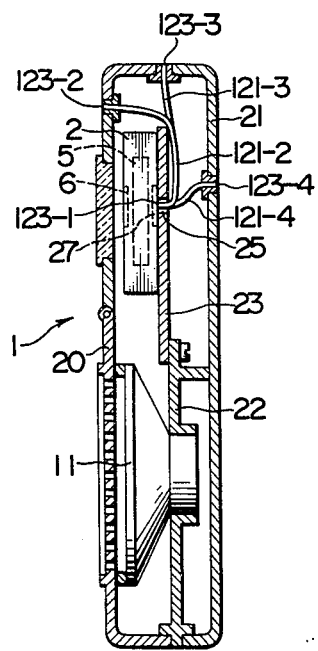
FIG. 15 is a cross-section of the miniature tape recorder incorporating yet another embodiment of the invention.
Figure 16:
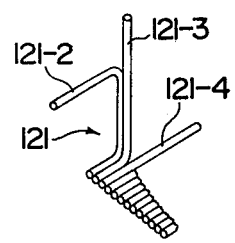
FIGS. 16 and 17 are perspective views, illustrating examples of a branched light conducting member.
Figure 17:
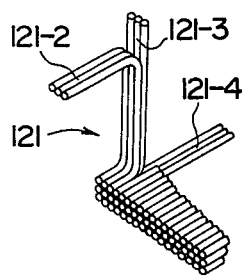

Referring to FIGS. 15 to 17, there is shown an embodiment of the invention which utilizes a light conducting member in the form of a bundle of light conducting fibres or the like to allow admission of external light, incident on at least two surfaces of the casing of the tape recorder, into the light transmitting opening in order to enable a clear monitoring of the tape. The miniature tape recorder to which the present embodiment is applied is constructed similar to that shown in FIGS. 1 and 2 except for the light conducting member and its associated parts, and therefore will not be described again. For this reason, the plan view of FIG. 1 will be referred to as required. FIG. 1 is a cross-section of the miniature tape recorder which incorporates a light conducting member in the form of a bundle of light conducting fibres to admit external light, incident on at least two surfaces of the casing of the tape recorder, into the light transmitting area so as to facilitate monitoring of the tape. Except for the light conducting member and its associated parts, the arrangement of various parts is similar to the arrangement of parts shown in FIG. 2. Specifically, the body 1 of the tape recorder includes the casing 20 forming the front one-half including the front surface, the casing 21 forming the rear one-half including the rear surface, and the frame 22 on which internally housed parts are mounted. The chassis 23 which forms the bottom surface of the chamber 1a for receiving the cassette 2 as well as the loudspeaker 11 is mounted on the frame 22.

As one example of the light conducting member used in the apparatus of the invention, the bundle of light conducting fibres is formed by fibres of glass or plastic material having a diameter on the order of several tens of microns which are bundled together. The bundle has the ability of conducting incident light on one end thereof to the other end without attenuation if the individual fibres are bent at will, and such flexibility can be utilized in providing an integral coupling at one end and providing a plurality of branches at their other end.

When the fibres are entirely bundled together at their one end to provide one end face of the bundle while they are divided into a plurality of branches to provide a plurality of end faces, light incident on said one end face may be caused to emit from the plurality of end faces of the respective branches. Conversely, incident light on the plurality of end faces of the respective branches may be combined together in said one end face for emission therefrom.

The apparatus of the invention utilizes the well known bundle of light conducting fibres in a sophisticated manner to admit external light, which is incident on at least two surfaces of the casing of the tape recorder, into the interior of the tape recorder so as to be led by the bundle of light conducting fibres to the tape monitoring window located on the rear side of the cassette in order to permit a tape monitoring by the emission of light from the end face therefrom. In the embodiment shown in FIG. 15, external light is made incident on the three surfaces, namely, the front surface, the rear surface and the upper surface, of the tape recorder casing so as to be admitted into the recorder. The external light incident on these three surfaces are collected into a single location by the bundle of light conducting fibres as mentioned below to provide lighting for the tape monitoring.

FIGS. 16 and 17 show examples of a bundle of light conducting fibres 121 which bundle is divided into three branches. FIG. 16 shows a basic arrangement in which the light conducting fibres are aligned with each other and bundled together at their one end while at their other end, the single fibres are branched into the front surface, the upper surface and the rear surface, respectively. FIG. 17 shows another example of the arrangement in which the light conducting fibres are arrayed in three tiers at their one end, and three fibres each from the upper tier, the middle tier and the lower tier are branched into the front surface, upper surface and rear surface, respectively. It will be appreciated that the branching may be made at will, and the other end of the respective branches may be bundled in an arbitrary manner. It is to be noted that a plurality of light conducting fibres bundled together is adhesively secured together by using an adhesive of synthetic resin material. As shown in FIG. 15, one bundled end 123-1 of the bundle 121 is fitted into the light transmitting opening 25 of a reduced width which is formed in the chassis 23 at a position corresponding to the monitoring windows 6, 27 in the cassette 2, with its end face secured to the chassis 23 in opposing relationship with the monitoring windows 6, 27 of the cassette 2. Respective branches 121-2, 121-3 and 121-4 of light conducting fibres have their end faces fitted and secured into light admitting openings formed in the front surface, upper surface and rear surface of the casing of the tape recorder, respectively. Each of the end faces is flush with the respective outer surfaces of the casing. Thus constructed, light incident on these surfaces of the tape recorder is collected together into the end face 123-1 of the bundle 121, without undergoing attenuation, for admission into the tape monitoring window 27 on the rear side of the cassette 2 to be transmitted through the latter. As a consequence, the tape winding can be clearly viewed through the monitoring window 6 on the front side of the cassette.

It is only necessary that external light of a significant intensity be incident on any one of the surfaces of the tape recorder. If the incident light is of a low intensity, the combined light is sufficient for practical purposes. Of course, external light incident on any surface of the tape recorder may be utilized for the intended purpose.

The bundle of light conducting fibres utilized as the light conducting member may be replaced by a light conducting plate such as acrylic plate, for example, for the purpose of reducing the cost. For an arrangement of FIG. 16, a thin acryl sheet may have its individual end portions slitted and bent, and for an arrangement of FIG. 17, three acryl sheets may be stacked one above another and their end portions slitted and bent.

The tape monitoring will be facilitated by an effective use of a significant amount of light which is incident on the cassette from the front side thereof. An embodiment directed to such use will be described with reference to FIGS. 18 and 19. Specifically, referring to FIG. 18, a pair of transversely extending reflecting members 131, 132 are applied to the bottom surface of the cassette receiving chamber 1a in parallel relationship with the light transmitting window 25. Usually the light transmitting window 25 has a reduced width compared with the width of the viewing window 27, and the reflecting members 131, 132 are disposed above and below the light transmitting window 25 in alignment with the viewing window 27. These members may comprise a reflective paint having a good optical reflectivity applied to the bottom surface of the cassette or strip-shaped mirrors fitted therein.

Figure 18:
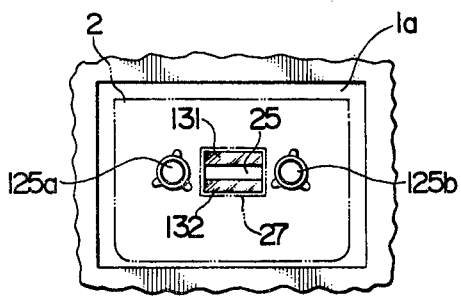
FIGS. 18 and 19 are schematic plan views of a reflector and a light transmitting area used in the apparatus of the invention.
Figure 19:
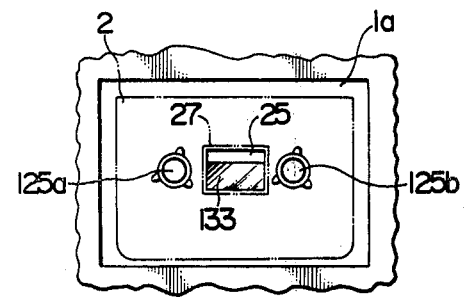

With this construction, light incident on the front side of the cassette and reflected by the reflecting members 131, 132 combines with the light incident on the rear side of the cassette and transmitted through the light transmitting opening, thereby contributing to facilitating a tape monitoring. The reflecting members 131, 132 may have a width which is determined in accordance with the width of the monitoring window 27 as well as the light transmitting area 25 and the proportion of the amount of light incident on the front and rear surfaces of the cassette. As indicated in FIG. 19, a single reflecting member may be disposed below the light transmitting area. Reference characters 125a, 125b shown in FIGS. 18 and 19 represent tape reel drive shafts.

What is claimed is:

1. A tape viewing system for a micro-cassette tape recorder having a cassette receiving chamber; said chamber having a bottom surface and a lid opposite said bottom surface; said lid having a transparent viewing window; said cassette having a tape viewing section; said window being aligned with said tape viewing section when said cassette is inserted in said chamber;

a light transmitting opening in said bottom surface of said cassette receiving chamber and located within the boundaries of said tape viewing section and said tape viewing window, external light incident on at least portion of the casing of the recorder being led through the light transmitting opening to be incident on the rear side of the tape cassette, thereby facilitating a tape viewing through the tape viewing window.

2. A tape viewer according to claim 1, further including a lens being fitted into the light admitting opening.

3. A tape viewer according to claim 2, further including a light conducting member connected between the light admitting opening and said window.

4. The tape monitor of claim 2 wherein said lens is a cylindrical lens.

5. The tape monitor of claim 2 wherein said lens is a convex lens.

6. A tape monitor according to claim 3 in which the light conducting member has its light emitting end disposed beneath said transparent viewing window of said lid; said light conducting member having a plurality of branch ends remote from its light emitting end; a plurality of light transmitting openings in said casing in at least two surfaces thereof; said branch ends being disposed adjacent said light transmitting openings.

7. The tape monitor of claim 3 wherein said light conducting member is comprised of a bundle of light conducting fibers.

8. A tape viewer according to claim 1, further including a reflecting member of a good optical reflectivity disposed around the light transmitting opening in the bottom surface of the cassette receiving chamber.

* * * * *